United States Patent [19]

Cridge et al.

[11] Patent Number: 5,514,321
[45] Date of Patent: May 7, 1996

[54] REACTION INJECTION MOLDING INORGANICS

[75] Inventors: Peter D. Cridge, Newtown, Pa.; Thomas A. Gallo, Mt. Holly, N.J.

[73] Assignees: Cridge, Inc.; Thomas A. Gallo, both of Morrisville, Pa.

[21] Appl. No.: 299,452

[22] Filed: Sep. 1, 1994

[51] Int. Cl.$^6$ .............................. B29B 7/00; B29C 45/00
[52] U.S. Cl. ...................... 264/240; 264/257; 264/260; 264/313; 264/328.6; 264/259
[58] Field of Search ................................ 264/60, 63, 257, 264/260, 313, 328.6, 259, 240

[56] References Cited

U.S. PATENT DOCUMENTS 4,564,491  1/1986  Koestecki .
5,096,644  3/1992  Endo et al. .............................. 264/137

*Primary Examiner*—Christopher A. Fiorilla
*Attorney, Agent, or Firm*—Gregory J. Gore

[57] ABSTRACT

A process creates molded pans by reaction injection molding (RIM) of inorganics. Two or more slips are mixed as they are being fed into a mold and the slips react rapidly with each other to form a mechanically strong part. The slips contain ceramics/metals which chemically react to form a binding phase, or which destabilize, floc, or gel to form the part. The formed part is then removed from the mold and used as is, or heat-treated prior to use. With this forming process, setting times are independent of part size, unlike slip casting or injection molding, and there is no requirement to add or remove heat from the mold to form the part.

15 Claims, No Drawings

REACTION INJECTION MOLDING INORGANICS

FIELD OF THE INVENTION

The present invention relates to the forming of ceramic/metallic greenware, or ceramics/metals which do not need to be fired, using a two or more part RIM system.

BACKGROUND OF THE INVENTION AND DESCRIPTION OF PRIOR ART

Since 1500 AD, ceramics have been formed by feeding a fluid slip of ceramic materials into a porous mold. The mold absorbs the liquid, thus building up a solid layer or casting which is the "green" (unfired) ceramic part. Slip casting generally takes a long time to form one part and this disadvantage of setting time increases exponentially with increasing part size and which also increases with the use of finer solid materials. Ceramic greenware has also been formed by mixing powders with organic binders, such as wax, which are heated to form a flowable mixture and then fed into a cold mold, thus forming a solid part. With a wax system, it is difficult to heat treat or sinter such greenware without having it melt into a flowable mixture. Also, the parts cannot be used without heat treatment.

Typical industrial practices for making complex-shaped ceramics have used organic liquids for dispersing fine ceramic particulates with polymeric binders and plasticizers for easy forming and handling. However, environmental restrictions and economic concerns shortly required the development of alternative processing methods which do not employ organic solvents or polymeric additives. Polymeric binders and plasticizers also pose problems in injection molding with respect to incomplete binder burnout and excessive burnout time.

Patent prior art of which the applicant is aware includes U.S. Pat. No. 5,190,709 issued to Lukacs, III. This patent describes a one-slip system which contains an organometallic precursor. This precursor needs to be heated to react and form the binder. This process has the disadvantage of using expensive organometallic materials which add so little ceramic to the final product that there is little advantage over using simple organic binders. Furthermore, heat must be transferred to the part to cure the precursor, so forming time is dependent on part size and choice of mold material. U.S. Pat. No. 5,188,780 to Lange et al discloses a method of preparing a dense ceramic product by forming coagulated, weakly attractive ceramic networks. The solid content is increased after coagulation, but before forming. With the Lange process, however, parts must be dried in a non-porous mold for 24 hours or longer. In U.S. Pat. No. 4,624,808 issued to Lange, ceramics are formed by flocculation followed by centrifuging. The actual forming process is centrifuging and the flocculation reaction does not form a part, but is used to increase the effective particle size of the material so it will settle faster. U.S. Pat. No. 4,734,237 issued to Fanelli and Silvers uses an organic gelling agent which sets by cooling. U.S. Pat. No. 2,898,306 to Cramer and Jenkins discloses methods in which alumina gels are formed by slowly increasing the pH of alumina sols. This is achieved through the decomposition of urea to generate ammonia in situ. The reaction requires 10 hours. It is also generally known to form net shape ceramics by flocculation of alumina.

In all of the above-described prior art molding systems, setting times are slow and are dependent upon part size. In many cases, organic or organometallic binding phases are required, necessitating the removal of a carrier or removal of heat from the mold to form the part.

SUMMARY OF THE INVENTION

In order to overcome the problems with the prior art described above, a process has been developed for the reaction injection molding (RIM) of inorganics. The present process entails the mixing of two or more slips as they are being fed into a mold. The slips react rapidly with each other to form a mechanically strong part. The slips contain ceramics/metals which chemically react to form a binding phase, or which destabilize, floc, or gel to form a part. The formed part is then removed from the mold and used as is, or heat-treated prior to use. With this new forming process, setting times are independent of part size, unlike slip casting or injection molding, and there is no requirement to add or remove heat from the mold to form the part.

More specifically, the applicant has invented a method of casting a ceramic part, comprising: providing a first stable slip containing ceramic powder and a first reaction compound; providing a second stable slip which contains ceramic powder and a second reaction compound; injecting only the first slip and the second slip into a mold, the slips being mixed as they enter the mold, the first and second reaction compounds reacting to harden and form a ceramic greenware part of handleable strength; and removing the part from the mold directly after completion of the setting reaction without the application of heat or the removal of carrier liquid.

As will be more fully described herein, systems are disclosed in which slips, one containing an acid and the other containing a base, react when brought together to form a salt or binding phase. In a second example, two slips gel when brought together. In both cases, the slips are combined by impingement mixing as they enter the mold and setting times are extremely short, taking place within 10–120 seconds, yielding a molded part which is strong enough to be easily handled without damage.

It is therefore the object of the invention to provide a system for casting ceramic materials which has a very rapid setting time and which is not dependent upon part size. It is a further object of the invention to provide a ceramic casting system without the need for removal of a carrier or heat from the mold to form the part. Other objects and advantages will become apparent to those of ordinary skill in the art from the following description of the preferred embodiment.

DESCRIPTION OF THE PREFERRED EMBODIMENT

The present invention utilizes two stable slips which react quickly as they enter the mold. Slips according to the present invention include solid materials having a particle size from 0.01–1000 microns, and preferably between 0.1–100 microns, which are added to the compositions until the volume fraction of solids is 40–70% and preferably above 50%. The viscosity is preferably below 10,000 cps and shear thinning is employed to keep coarse materials suspended and still be easy to fill a mold. Viscosities below 1,000 cps are sometimes preferred and these slips can be mixed in a low or high shear mixer or can be ball milled. A dispersant can be added to further decrease the viscosity. Slips can be deaired to remove bubbles, and mold release agents and defoamers can also be added. The amount of dispersants, mold release agents, wetting agents and defoamers are generally 0.1 to 2.0%.

In a first example of reaction-injected molded ceramic slips according to the present invention, a binding phase is created when acidic phosphate reacts with a basic magnesium. The formulation of slips according to this first example are as follows.

To form an inorganic binding phase:

Slip A, by weight, is comprised of:

20.4% water 14.1% inorganic phosphorous compounds 65.5% fused silica 0.1% optional surfactant/mold release agent/wetting agent/defoamer Slip B, by weight, is comprised of:

24.4% water 12.2% inorganic magnesium compounds 1.6% fused silica 0.4% surfactant Slips A and B are mixed approximately one part A and one to two parts B by impingement mixing with or without the use of a static mixer. The body creams in about 10 seconds and parts can be removed from the mold in approximately one minute. To form parts with good strength when a binder phase is used, the binder phase will probably be at least 5% of the body.

According to a second example, slips may be formulated which destabilize and gel rapidly. An example of such a system may be demonstrated by the use of the following formulations.

To utilize a destabilization mechanism:

Slip A, by weight, is comprised of:

34.8% of colloidal silica sol, 34% silica, pH of about 3

3.0% inorganic salt 62.2% fused silica

Slip B, by weight, is comprised of:

33.0% of colloidal silica sol, 15% silica, pH of about 9

66.7% fused silica 0.3% surfactant

Slips A and B are mixed with a ratio of approximately one part A and one part B by impingement mixing with or without the use of a static mixer. These parts gel in about 15–30 seconds and they can be removed from the mold in approximately one minute, however, they are still somewhat flexible. If parts are formed by gelation/flocculation/destabilization finer particles, high surface area material tends to give stronger parts.

According to a third example, fibers may be added to the mold prior to filling with the slips:

To utilize a system using fibers:

Slip A, by weight, is comprised of:

93.9% colloidal silica sol

34% silica, pH of about 3

6.1% inorganic salt

Slip B, by weight, is comprised of:

100% colloidal silica sol

15% silica, pH of about 9

Slips A and B are mixed with a ratio of approximately one part A and one part B by impingement mixing with or without the use of a static mixer. They are fed into a mold that contains carbon fibers. These parts gel in about 15–30 seconds and can be removed from the mold in about one minute.

With the above-described systems, parts can be used as is or heat treated to form a dense or porous material. The molds used in these forming systems may add or remove heat from the system, but this heat exchange is not necessary to the formation of the part. This means that the forming time is independent of part size and that molds have no thermal conductivity requirements. Hence, plastic or rubber molds can be used instead of expensive metallic molds commonly used in wax-based injection molding systems. This is a critical feature of the invention.

Forming stable slips is an important part of the present RIM system. In a silica system, the use of metastable silica at a pH of approximately 3 works well because the slips are stable for months and stability is not affected by salt additions. In a calcium or magnesium phosphate system, the choice of acid and base compounds will affect reactivity and stability. High surface area oxides are very reactive and not very stable in an aqueous environment. Talc is a low reactivity, highly stable source of magnesium. Carbonates can be used to form foamed ceramics.

Mixing is an important step in the formation of parts by RIM of the above-described systems. Lower viscosity slips are easier to mix; but, high volume percent solids, and therefore higher viscosity slips, are usually preferred. Mixing by the impingement of fine streams of slips at high velocity is usually the preferred process because it requires no cleaning of a mixing blade or element. Typically, pressure of 100 to 3,000 psi is required. Static mixers can be built into the mold design to ensure good mixing. A cold shot or "dead area" can be added to the mold to trap the first few milliliters of slip, which tends to be less well mixed. Ceramics and other abrasive materials bring challenges to the selection of feeding and mixing equipment. A lance pump is particularly suited to feeding ceramic materials and the use of carbide or polymeric parts is recommended to reduce wear.

When a pan is formed by RIM of the present invention, the reaction which sets the part should be slow enough that the mold is full prior to the pan "creaming", yet fast enough that the part can be demolded in an economically short period of time. Typically, a mold will take more than one second to fill, but not more than sixty seconds to fill. Longer cream times may be desirable if a deairing step is needed. The pans should be mechanically strong enough to demold in one second to one hour after the mold is filled. Slips can be heated or cooled to control the viscosity and reaction time. Microwaves can be used to decrease the time to demolding.

As described above, the objects of the invention have been achieved. The present invention provides a method of casting a ceramic material which has setting times independent of pan size and does not require the use of organic or organometallic binding phases. Furthermore, parts are formed very quickly without the need to remove heat from mold to form the part.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. The method of casting an inorganic part, comprising:
   providing a first stable slip A containing inorganic powder and a first inorganic reaction compound;

providing a second stable slip B which contains inorganic powder and a second inorganic reaction compound; and injecting only said first and said second slips into a mold, said slips being mixed together as they enter the mold, and said first and said second inorganic reaction compounds reacting to harden and form a part.

2. The method of casting an inorganic part, comprising:

providing a first stable slip A containing inorganic powder and a first inorganic reaction compound;

providing a second stable slip B which contains inorganic powder and a second inorganic reaction compound;

injecting only said first slip and said second slip into a mold, said slips being mixed as they enter the mold, said first and said second inorganic reaction compounds reacting to harden and form a part of handleable strength; and removing the part from the mold directly after completion of a setting reaction without the application of heat or the removal of carrier liquid.

3. The method of casting an inorganic part according to claim 2, wherein said slips are combined by impingement mixing.

4. The method of casting an inorganic part according to claim 3, wherein said impingement mixing of said slips is conducted at a pressure in a range of 100 to 3,000 psi.

5. The method of casting an inorganic part according to claim 2, wherein said mold is composed of rubber.

6. The method of casting an inorganic part according to claim 2, wherein one of said slips contains an acid and the other of said slips contains a base.

7. The method of casting an inorganic part according to claim 6, wherein one slip is an acidic phosphate and the other slip is a basic magnesium.

8. The method of casting an inorganic part according to claim 7, wherein said slips react rapidly to form a salt.

9. The method of casting an inorganic part according to claim 8, wherein slip A, by weight, comprises:

20.4% water 14.1% inorganic phosphorous compounds 65.5% fused silica 0.1% optional surfactant/mold release agent/wetting agent/defoamer, and slip B, by weight, comprises:

24.4% water 12.2% inorganic magnesium compounds 61.6% fused silica 0.4% surfactant.

10. The method of casting an inorganic part according to claim 2, wherein said two slips gel when brought together.

11. The method of casting an inorganic part according to claim 10, wherein slip A, by weight, comprises:

34.8% of colloidal silica sol, 34% silica, pH of about 3

3.0% inorganic salt 62.2% fused silica and slip B, by weight, comprises:

33.0% of colloidal silica sol, 15% silica, pH of about 9

66.7% fused silica 0.3% surfactant.

12. The method of casting an inorganic part according to claim 2, further including a preliminary step of adding fibers to the mold prior to filling the mold with slips.

13. The method of casting an inorganic part according to claim 12, wherein said fibers are carbon fibers.

14. The method of casting an inorganic part according to claim 13, wherein slip A, by weight, comprises:

93.9% colloidal silica sol

34% silica, pH of about 3

6.1% inorganic salt and Slip B, by weight, comprises:

100% colloidal silica sol

15% silica, pH of about 9

15. The method of casting an inorganic part according to claim 2, wherein said inorganic powder of slip A is a ceramic powder.

\* \* \* \* \*